No. 642,740. Patented Feb. 6, 1900.
A. DUQUESNE.
LOOM FOR WEAVING PILE FABRICS.
(Application filed Dec. 16, 1897.)//(No Model.) 10 Sheets—Sheet 1.

Fig. 1

WITNESSES:
Fred White
Thomas F. Wallace

INVENTOR:
Adrien Duquesne,
By his Attorneys:
Arthur C. Fraser & Co.

No. 642,740. Patented Feb. 6, 1900.
A. DUQUESNE.
LOOM FOR WEAVING PILE FABRICS.
(Application filed Dec. 16, 1897.)
(No Model.) 10 Sheets—Sheet 2.

WITNESSES:
Fred White
Thomas F. Wallace

INVENTOR:
Adrien Duquesne,
By his Attorneys:
Arthur C. Fraser & Co.

THE NORRIS PETERS CO., PHOTO-LITHO., WASHINGTON, D. C.

No. 642,740. Patented Feb. 6, 1900.
A. DUQUESNE.
LOOM FOR WEAVING PILE FABRICS.
(Application filed Dec. 16, 1897.)
(No Model.) 10 Sheets—Sheet 3.

WITNESSES:
Fred White
Thomas F. Wallace

INVENTOR:
Adrien Duquesne,
By his Attorneys
Arthur E. Fraser & Co.

No. 642,740. Patented Feb. 6, 1900.
A. DUQUESNE.
LOOM FOR WEAVING PILE FABRICS.
(Application filed Dec. 16, 1897.)
(No Model.) 10 Sheets—Sheet 5.

WITNESSES: INVENTOR:
Adrien Duquesne,
By his Attorneys

No. 642,740. Patented Feb. 6, 1900.
A. DUQUESNE.
LOOM FOR WEAVING PILE FABRICS.
(Application filed Dec. 16, 1897.)
(No Model.) 10 Sheets—Sheet 6.

FIG. 18.

WITNESSES:
Fred White
René Bruine

INVENTOR:
Adrien Duquesne,
By his Attorneys

No. 642,740. Patented Feb. 6, 1900.
A. DUQUESNE.
LOOM FOR WEAVING PILE FABRICS.
(Application filed Dec. 16, 1897.)
(No Model.) 10 Sheets—Sheet 9.

FIG. 23.

WITNESSES: Fred White, Rene Bruinef

INVENTOR: Adrien Duquesne,
By his Attorneys:

UNITED STATES PATENT OFFICE.

ADRIEN DUQUESNE, OF PARIS, FRANCE.

LOOM FOR WEAVING PILE FABRICS.

SPECIFICATION forming part of Letters Patent No. 642,740, dated February 6, 1900.

Application filed December 16, 1897. Serial No. 662,231. (No model.)

*To all whom it may concern:*

Be it known that I, ADRIEN DUQUESNE, a citizen of the Republic of France, residing in Paris, France, have invented certain new and useful Improvements in Self-Acting Looms for Weaving Pile Fabrics, (the same being the subject-matter of Letters Patent in France, No. 266,786, dated May 10, 1897,) of which the following is a specification.
The manufacture of pile fabrics with looped and cut pile, such as the pile-carpet known as "Tapis Parisien," presents peculiar difficulties, in particular when it is required to manufacture figured fabrics. In this case, as certain threads require to be raised separately, although grouped together with other threads that have to make the net-twist, it was necessary to specially separate such threads for enabling a regular weaving to be effected and prevent the formation of knots and other similar faults. When working by hand, this separation is effected satisfactorily by a skilful workman, who introduces a rod in the open shed of the warps and separates the threads by pressing the rod more or less forcibly against the fabrics by means of the batten; but in the self-acting looms this operation presented a difficulty which I have succeeded in overcoming by means of separating devices which I have invented and which imitate automatically the action of the hands. I will describe such devices with reference to the accompanying drawings, in which—

Figures 2, 10:
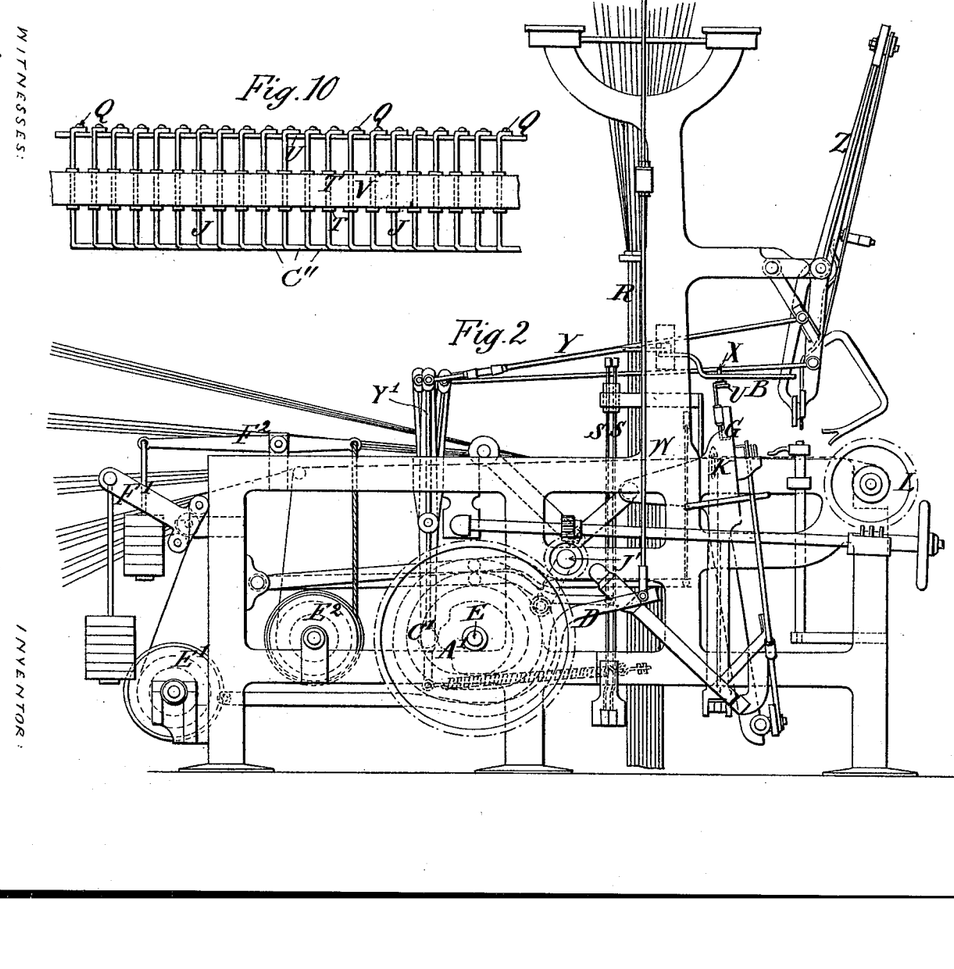
Fig. 2 is a left side elevation.
Fig. 10 is an enlarged front elevation of the sectional form of the separating-rod, one of the sections or spindles thereof being shown detached on a still larger scale in Fig. 11 and in end view in Fig. 12.
Figures 3, 4:
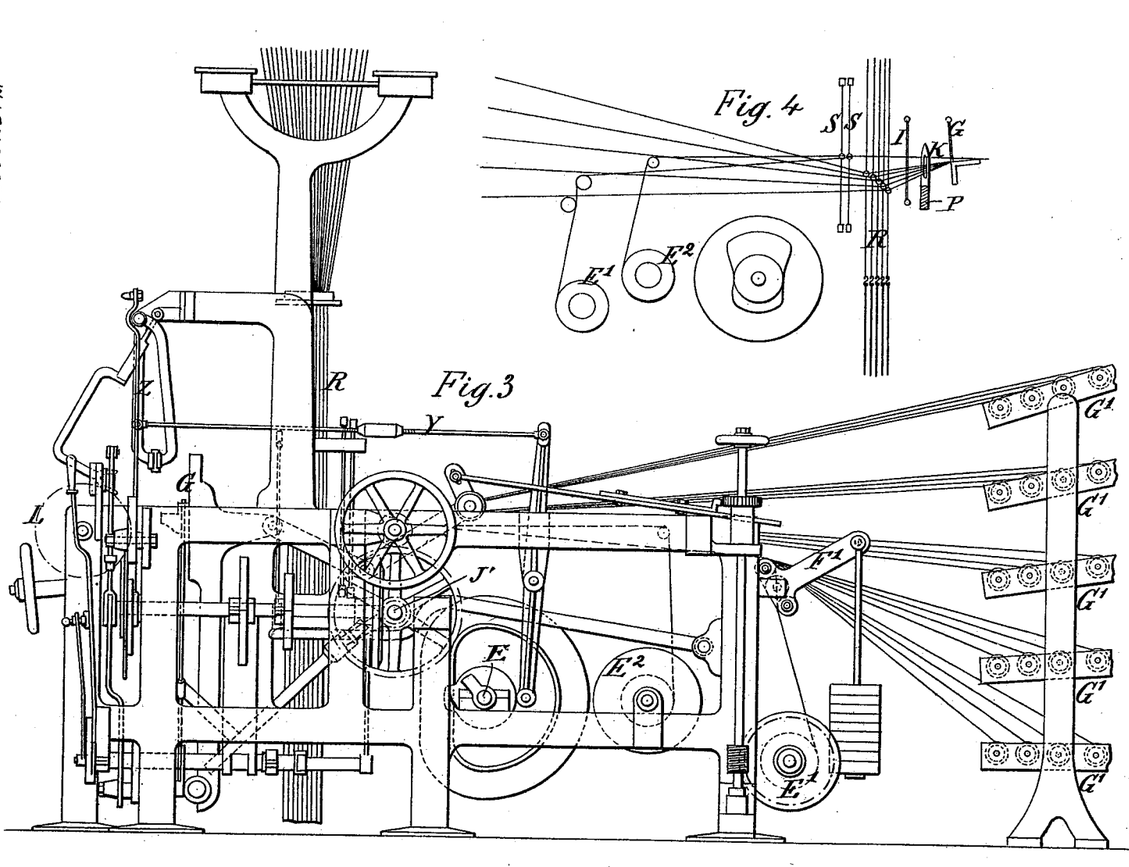
Fig. 3 is the opposite side elevation.
Fig. 4 is a diagram in longitudinal section through the loom, indicating the working of the threads.
Figure 13:
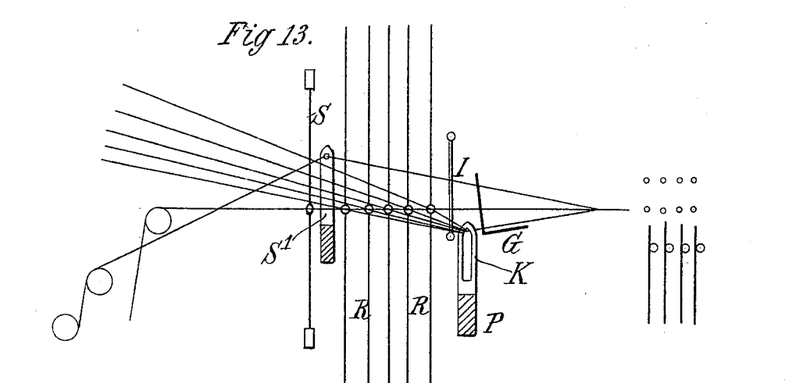
Fig. 13 is a diagram corresponding to Fig. 4, but showing a different arrangement.
Figure 14:
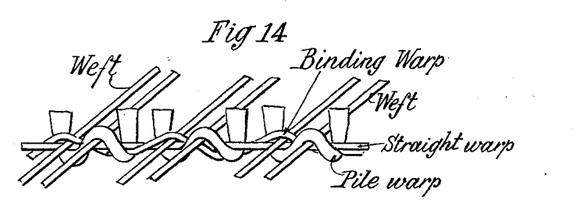
Fig. 14 is an oblique view showing the woven fabric produced by the arrangement shown in Fig. 13.
Figure 15:
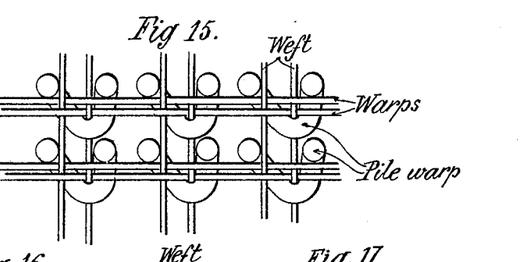
Fig. 15 is a plan view showing the woven fabric when the binding-warps are extended straight instead of being twisted around the straight warps, being produced by the mechanism shown in Fig. 4.

The warp-threads intended for producing the looped pile on the front face of the fabric, and which I will assume to be woolen threads, are arranged on the bobbin-racks G' G', Fig. 3, to the number of five in the present instance. The binding-warps are on the beam E' and are maintained in suitable tension by weighted regulators F'. The straight warps intended for forming the under surface or backing of the fabric are on another beam $E^2$ in front of the first one and are also kept in tension by weighted regulating-brakes $F^2$, Fig. 2. The threads from the rack-bobbins pass through the long holes of vertical metal plates of a needle-comb K, Figs. 2 and 4, fixed at the lower part to a transverse beam P, Fig. 4, which connects them together. The binding-warps and the straight warps pass, respectively, through the eyes of two heddles S S. For one of the heddles S, serving for the binding or tying warps, can be substituted a comb S', as shown in Fig. 13, the teeth of which are provided at their upper ends with eyes the size of which corresponds to that of the eyes of the heddles. After passing through the heddles S S (or of the heddle S for the straight warp and the comb S' for the tying-warp) the two warps, as also the wool threads from the bobbins, pass through the guiding-comb I.

R shows the jacquard healds, with their eyes and leads. The rack bobbin-threads which are required to produce the pattern pass through the heald-eyes before passing through the holes of the plates of the needle-comb K. The guiding-comb I is placed between the healds and the said plates. The three groups of threads pass through the reed of the batten G, and the fabric, formed as will be explained, is coiled upon the cloth-beam L.

Figure 18:
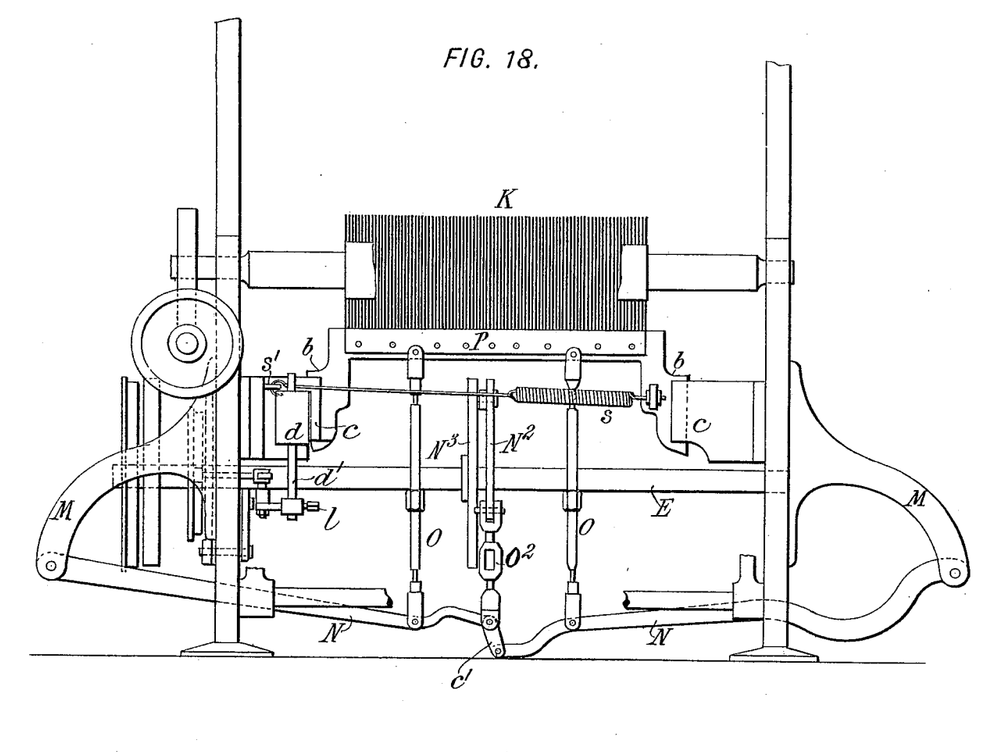
Fig. 18 is a front elevation showing chiefly the mechanism for operating the needle-comb.
Figure 19:
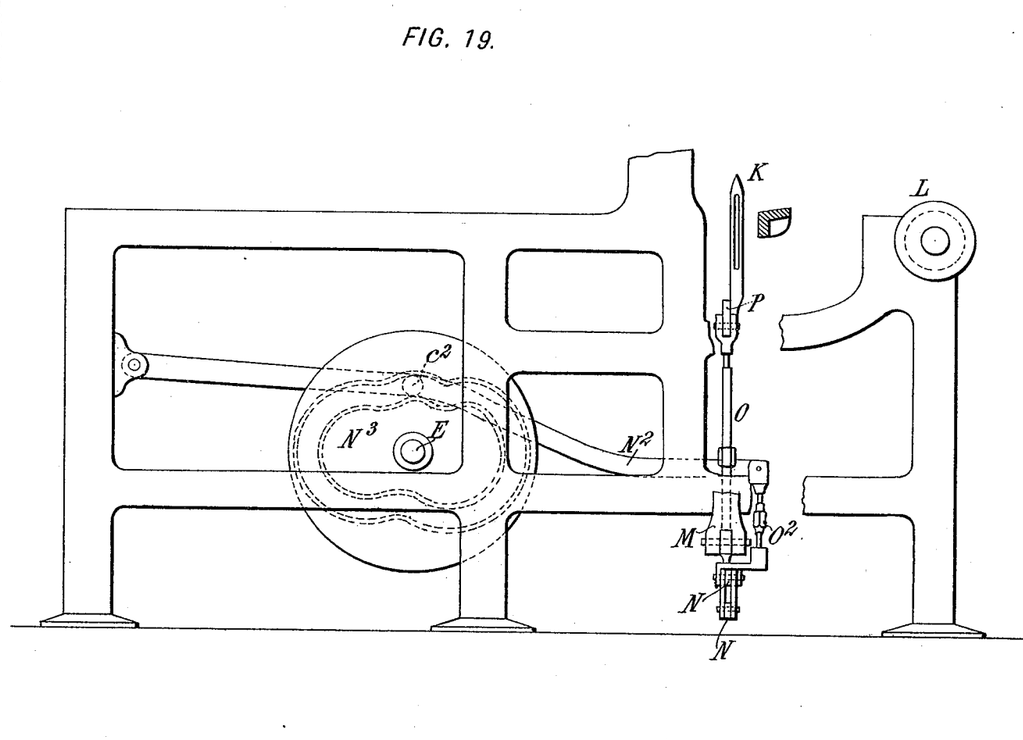
Fig. 19 is a side elevation, partly broken away, and showing the same mechanism.
Figure 20:
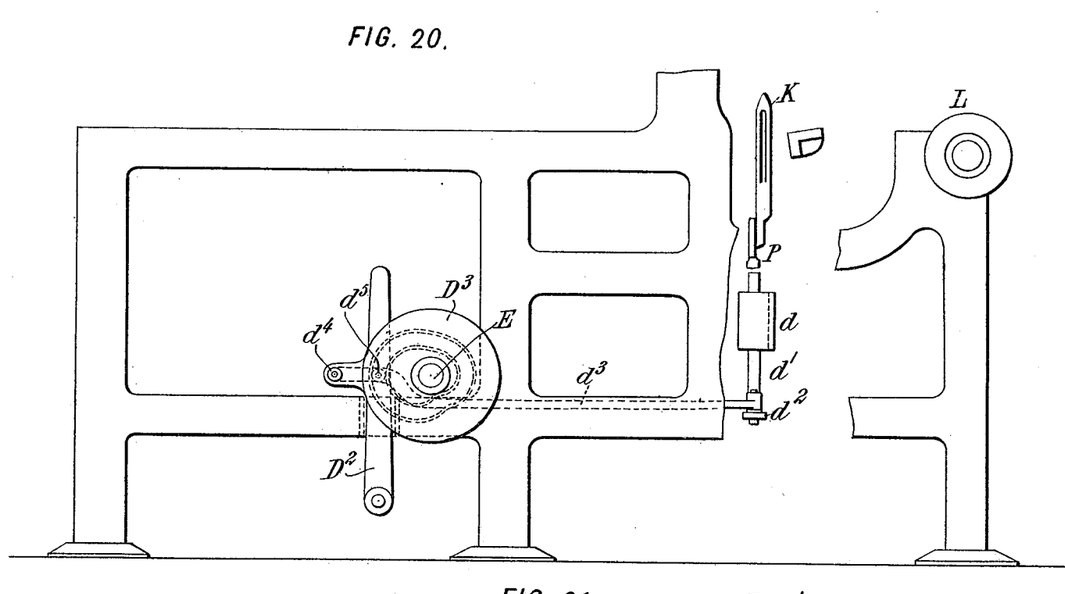
Fig. 20 is a side elevation, partly broken away, and showing chiefly the mechanism for giving lateral movement to the needle-comb.
Figure 21:
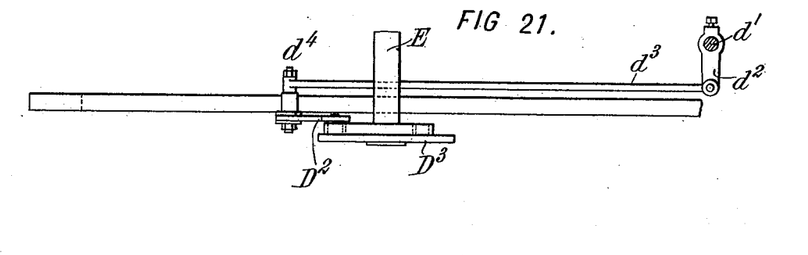
Fig. 21 is a fragmentary plan of the same.
Figure 22:
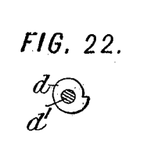
Fig. 22 is a horizontal section of the cam $d$ in Fig. 20.
Figure 23:
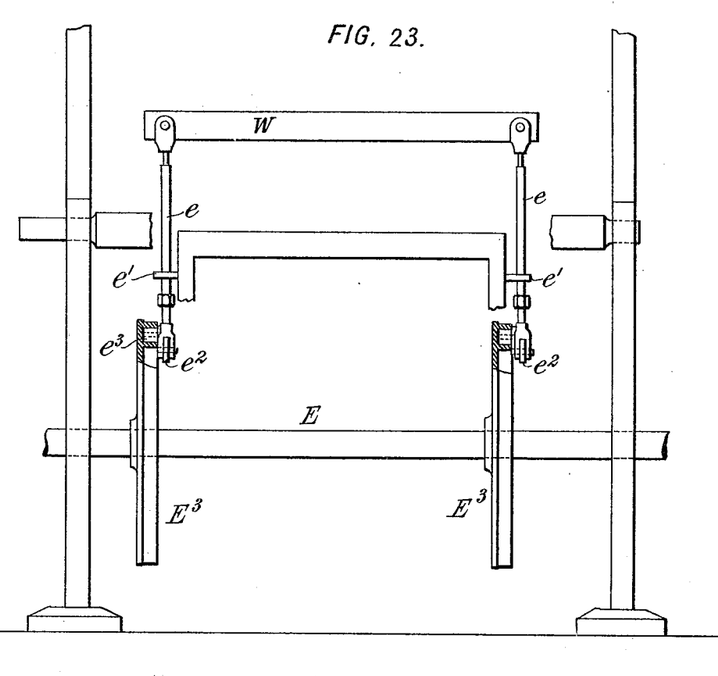
Fig. 23 is a fragmentary front elevation, partly in vertical section, showing the mechanism for operating the transverse bar W.

The transverse beam P, carrying the needle-comb K, has a rising-and-falling movement and also a short movement from side to side. The rising-and-falling movement is imparted by the mechanism best shown in Figs. 18 and 19. The beam P is formed at its ends as vertical slides $b\ b$, working in upright slideways $c\ c$. The beam P is connected by upright rods or links O O to two levers N N, respectively, which are pivoted on brackets M M, are connected together by a link $c'$, and are connected by an adjustable link $O^2$ to the end of a lever $N^2$, Fig. 19, which has a roller $c^2$ working in the groove of a cam $N^3$, which is fixed on main shaft E. By this system of levers and links the beam P is caused to rise and fall with a parallel motion. Its slides $b\ b$ are capable of moving laterally in the guideways $c\ c$. The beam is pressed to the left by a spring $s$, Fig. 18, connecting at one end to the beam and at the other or left-hand end to a fixed point $s'$ on the frame. By this means the left-hand slide $b$ is carried against an upright cam or cylinder $d$, the shape of which is shown in Fig. 22. This cam works in a cage formed in the left-hand slideway $c$, and is mounted on an upright shaft $d'$, to which is imparted an oscillatory movement at intervals for bringing portions of the cam of greater or less projection against the slide $b$ to force the beam P toward the right or to permit it to return under the impulse of the spring $s$ toward the left. For imparting this oscillatory movement the shaft $d'$ has fixed on it an arm $d^2$, which is connected by a rod $d^3$ to a stud $d^4$, projecting from a lever $D^2$, Figs. 20 and 21, which lever carries a roller $d^5$, which works in the cam-groove of a cam $D^3$.

Figure 24:
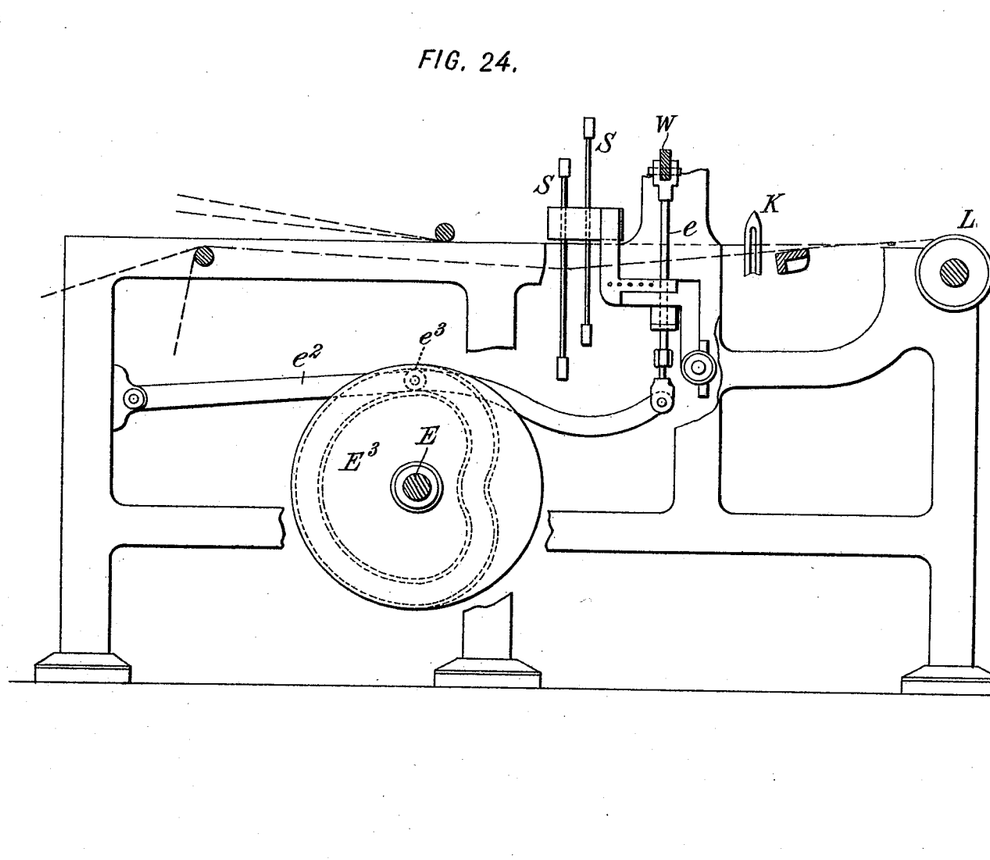
Fig. 24 is a side elevation, partly broken away, and showing also chiefly the mechanism for operating said bar.

A horizontal bar W is arranged transversely over the warps behind the batten and the jacquard. This bar is caused to press down at intervals upon the warps in order to render them very taut, especially where the shed opens, and produces thus a tendency to separation of the raised threads from those which are depressed, which aids the operation of the reeds of the batten. The bar W is carried at its ends by vertically-sliding rods $e\ e$, sliding in fixed guides $e'$ and connected at their lower ends to levers $e^2$, which, as shown best in Fig. 24, carry rollers $e^3$, which work in the grooves of cams $E^3$, fixed on the main shaft E. Thus at one point of the revolution the bar W is lowered onto the warps.

The fabric is produced in three distinct stages.

Figure 5:
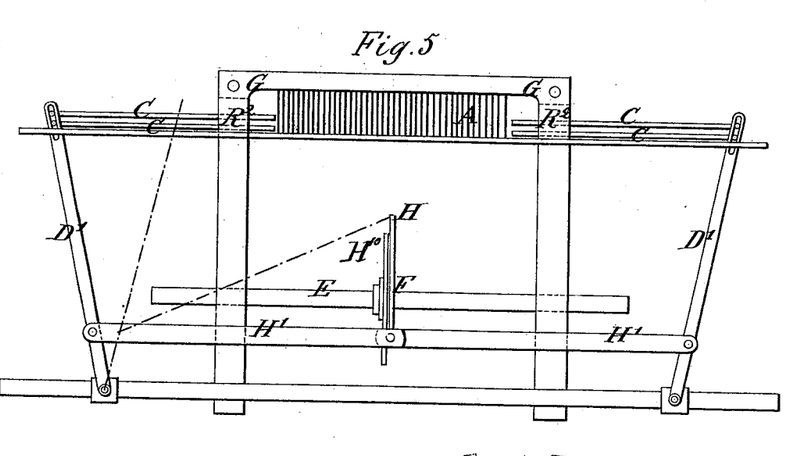
Fig. 5 is a front elevation of the batten or lay, showing the mechanism for operating the separate rods.
Figure 6:
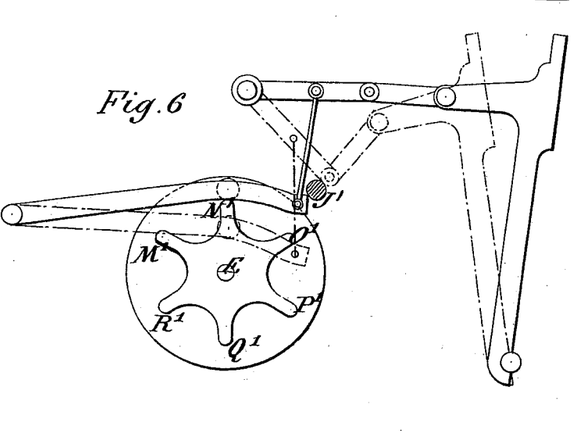
Fig. 6 is a side elevation of the batten-frame, showing the mechanism for operating it.
Figure 7:
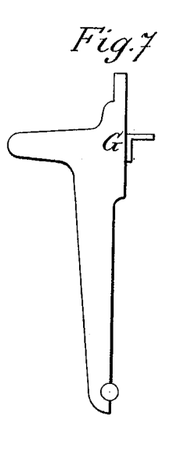
Fig. 7 is a side elevation of the batten frame or lay.
Figure 9:
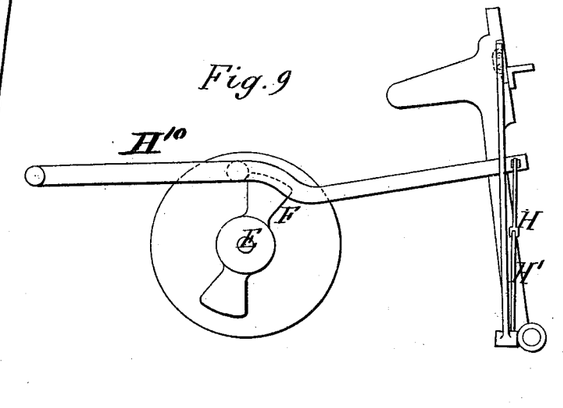
Fig. 9 is a side elevation of mechanism shown in Fig. 5.

First stage: The rise of the jacquard mechanism is effected by means of the lever D, Fig. 2. Previously the beam P of the needle-comb K has been raised. At this moment the plate or needles of the comb, the long openings of which carry the rack bobbin-threads, are at the right of the straight warp and form an angle below the fabric and the binding-warp. The threads which for the time being are not raised by the jacquard lie on the bottoms of the holes of the needles. The batten G is pushed backward, so as to fully open the shed. At this moment a rod is introduced in front of the reed of the batten, as in weaving by hand. This insertion is effected in a similar manner to the insertion of the pile-wires. Preferably this rod is divided at the middle into two half-rods C C, Fig. 5, which are passed in from each side of the frame, so as to meet at the middle. Figs. 5 and 9 show the means for operating these rods, comprising a cam F, fixed on shaft E and actuating, by means of the lever $H^{10}$, link H, and the two transverse links H', the levers D', which carry the two half-rods C. The cranked shaft usually employed for actuating the batten is replaced by a straight shaft J', Fig. 6, (which is a side view of Fig. 5,) and the batten is actuated in the following manner: On the shaft E there is fixed at each end a star with six arms M' N' O' P' Q' R' of unequal lengths. These arms of different lengths have for their object to vary the stroke of the batten, according to whether a rod is or is not inserted in front thereof. The succession of the movements is as follows: The arm N' of the star, which is shorter than the arm M', moves the batten to a less extent than before the introduction of the rod, so as to strike this and separate the threads, while allowing for the space occupied by the rod. The batten recedes. The rod also retires and reënters at once for disengaging the threads which could not be separated at the first stroke, and for this purpose the arm O', of equal length with N', imparts the same motion to the batten, whereby the threads are entirely separated. The batten again retires, as also the rod, and the pile-wire which is intended to raise the loop of the pile is passed in below the threads raised by the jacquard. This wire is actuated by the system of levers Z Z' and links $Z^2$, Figs. 1, 2, and 3, which works as in the known construction of looms for pile fabrics.

Second stage: The jacquard lowers the raised threads. The needle-comb, which, as stated, has passed to the right of the straight and binding warps for the rising motion of the jacquard, also descends, and at the same time moves from right to left to an extent equal to the spacing of the reeds of the batten G and of the guiding-comb I. The needle-comb then rises in this new position, thus causing the previously-raised threads, as also those remaining at the bottoms of the openings of the needles, to coil partly around the said warps—that is to say, producing the net-twist, with all the threads carried by the needle-comb. The arm P' of the star of the same length as M' causes the batten to strike against the fabric, the batten recedes, the shed opens, the rods or half-rods again enter the shed, and the arm Q', which is of the same length as N' and O', produces the before-described effect. The rods recede and the shuttle passes over the straight and binding warps and below the threads of the rack-bobbins.

Third stage: The needle-comb redescends and shifts laterally in the contrary direction to the first position—that is, from left to right. The binding-warp is then alone raised by the heddle S or by the needle-comb S', above referred to, and in the latter case this comb receives a lateral to-and-fro motion, like the needle-comb K with long holes, so as to cause the binding-warp to perform the same net-twist as was done by the comb K with the wool threads. The shuttle then passes under this warp, the comb S' of the binding-warp descends, and the needle-comb K as also the jacquard are ready for performing the first stage again. It is of course to be understood that at each passage of the weft and of the pile-wires the batten strikes and tightens the fabric.

Figure 8:
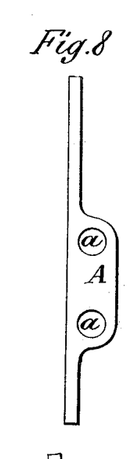
Fig. 8 shows, on a large scale, one of the teeth or plates of the batten.

Each of the two half-rods is preferably in duplicate—that is to say, formed of two superposed rods. In this case the reed of the batten has bars A, Figs. 5 and 8, enlarged at the back and having two superposed holes $a$ of a slightly-larger diameter than the section of the half-rods C C. It is preferable to thus employ two superposed rods C C in order to give greater separation to the warp-threads which are to be pressed apart from the neighboring threads. A single rod might produce sufficient separation, especially if given a large diameter or if made in the form of a plate in a vertical plane and of width suitable for giving the required degree of separation to the warp-threads; but rather than employ such widened rod or plate I prefer to duplicate the rods, as shown at C C in Fig. 5. These two sets of superposed half-rods on each side of the frame on meeting in the fabric occupy together the whole width of the latter. They are passed horizontally through the uprights $R^2$ of the batten by means of the levers D'. The cam F of the shaft E, above mentioned, actuates these levers by the lever H and links H', as above described. When the jacquard-threads are raised, the cam F, as stated, raises the lever $H^{10}$ to the position shown in dotted lines in Fig. 5. This motion causes the levers D' to approach each other, and consequently also the four rods C. The batten beats, and during the double stroke thereof the rods separate the wool threads and they then retire into their original position. The pile-wire having been entered, the jacquard-threads are lowered and the rising of the needle-comb is effected in performing the net-twist, as described. The rods C C then again enter between the wool threads and the straight warps and binding-warps and separate them under the stroke of the batten.

Figure 1:
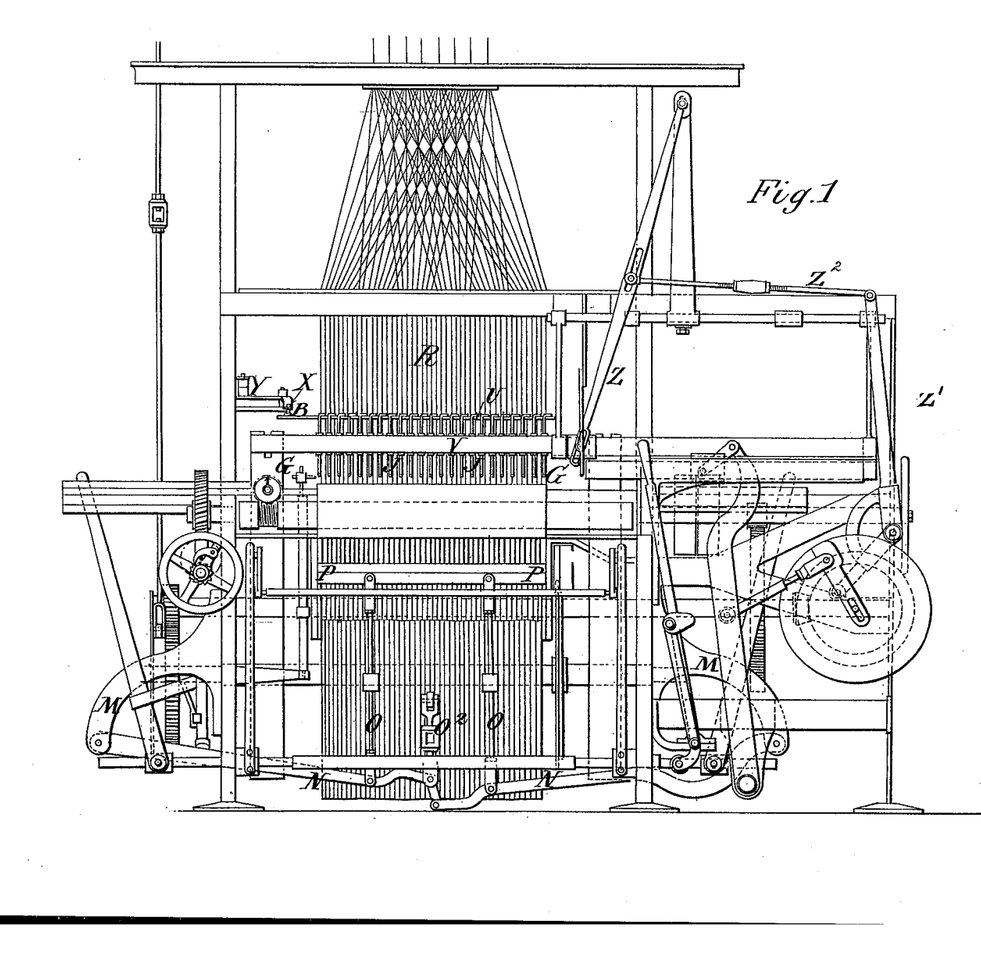
Figure 1 is a front elevation of the loom.
Figure 11:
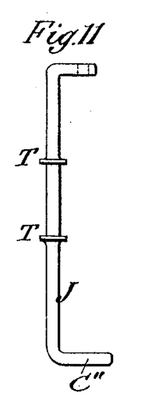
Figure 12:
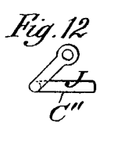
Figures 16, 17:
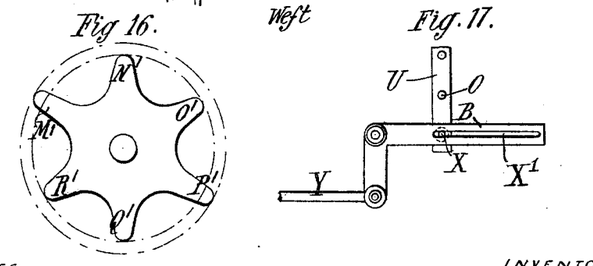
Fig. 16 is a detached elevation of the starwheel shown in Fig. 6.
Fig. 17 is a fragmentary plan showing the elbow-lever B and its connections.

A modification of the arrangement for separating the threads consists in forming the rod into a number of short lengths without altering the comb and in employing a cranked shaft for actuating the batten. In this case, as shown at Figs. 1 and 2 and to a larger scale at Fig. 10, the rod is formed of a number of arms C'' C'', formed on a series of small rock-shafts or hooked spindles J, one of which is shown detached at Figs. 11 and 12 on a larger scale. These spindles are held between two bands of flat iron V by means of the collars T. They are connected at top to a bar U by screws Q, while the lower parts of the spindles J are bent at right angles. The flat bands V are connected to the upper back part of the reed of the batten. On the bar U is fixed a stud X, which slides in a groove X', Fig. 17, in the longitudinal arm of an elbow-lever B, actuated by the rod Y and lever Y', which receive their motion from the cam A', acting upon the roller C', Fig. 2. Let us assume the batten to be at the limit of its forward stroke with the shed closed. The jacquard-threads then rise. The spindles J being turned into the position shown at Fig. 10, their arms constitute a continuous rod. The batten then moves away for opening the shed, and the roller C' drops simultaneously into the inner part of the cam A', so that the groove in lever B acts upon the stud X and causes the spindles J to turn, so that their arms C'' are at right angles to the reed. They thus pass between the raised jacquard-threads. As soon as the batten arrives at the end of its back stroke the roller C' will have reached the outermost part of the cam and will thereby cause the spindles J to turn with their arms parallel to the reed, so that as the batten moves forward for striking the fabric the continuous rod thus formed separates the raised threads. The roller C' then passes down again into the inner part of the cam A', causing the spindles J to turn their arms into the position parallel with the warps, the raised jacquard-threads descend, and the cam brings the spindles back into their original position with their arms at right angles to the warps, in which position they remain during the other stages of the weaving operation.

Independently of the separating-rods I make use of the horizontal transverse bar W, already described, which bears at intervals against the straight and binding warps for preventing them from being carried along when the cloth-beam is turned.

The above-described construction of loom enables not only figured or plain fabrics with looped or cut pile to be produced, but also fabrics presenting on their two sides a reversed rep-surface—that is to say, a transverse rep on the one side and a longitudinal rep on the other. It suffices for this purpose to replace the ordinary pile-wires by a filling of any suitable material.

I claim as my invention—

1. A loom for weaving pile fabrics, comprising the combination with means for carrying the warp-threads, and the batten, and means for inserting the pile-wires, of a rod movable into the shed to effect the separation of the threads, and mechanism for moving such rods at intervals.

2. A loom for weaving pile fabrics, comprising the combination with means for carrying the warp-threads, and the batten, and means for inserting the pile-wires, of a divided rod, the respective parts of which are movable into the shed to effect the separation of the threads, and mechanism for moving such rod at intervals.

3. A loom for weaving pile fabrics, comprising the combination with means for carrying the warp-threads, and the batten, and means for inserting the pile-wires, of two superposed rods movable simultaneously into the shed to effect the separation of the threads, and mechanism for moving such rods at intervals.

4. A loom for weaving pile fabrics, comprising the combination with means for carrying the warp-threads, and the batten, of a rod movable into the shed to effect the separation of the threads, and mechanism for moving such rod at intervals, and a rigid bar arranged to exert a pressure on the backing-warps in the contrary direction to the lifting motion of the pile-warp.

In witness whereof I have hereunto signed my name in the presence of two subscribing witnesses.

ADRIEN DUQUESNE.

Witnesses:
EDWARD P. MACLEAN,
AUGUSTE MATHIEU.